(12) United States Patent
Kunche et al.

(10) Patent No.: US 10,418,790 B2
(45) Date of Patent: Sep. 17, 2019

(54) HOUSING

(71) Applicant: Eaton Intelligent Power Limited, Dublin (IE)

(72) Inventors: Sunil Kumar Kunche, Pune (IN); Bhaskar Bhumeshwar Kurapati, Pune (IN); Roelof Soeten, Hengelo (NL); Willy Bielevelt, Hengelo (NL); Johan de Jong, Hengelo (NL)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 16/021,154

(22) Filed: Jun. 28, 2018

(65) Prior Publication Data

US 2019/0006823 A1    Jan. 3, 2019

(30) Foreign Application Priority Data

Jun. 29, 2017   (IN) .............................. 201711022836
Sep. 20, 2017   (GB) .................................. 1715143.2

(51) Int. Cl.
| | |
|---|---|
| *A47B 81/00* | (2006.01) |
| *H02B 1/38* | (2006.01) |
| *H02B 1/30* | (2006.01) |
| *H01H 9/02* | (2006.01) |
| *H02B 1/044* | (2006.01) |
| *H01H 71/08* | (2006.01) |

(52) U.S. Cl.
CPC ............. *H02B 1/38* (2013.01); *H01H 9/0207* (2013.01); *H02B 1/044* (2013.01); *H02B 1/306* (2013.01); *H01H 71/08* (2013.01)

(58) Field of Classification Search
CPC .......... H02B 1/38; G06F 1/181; G06F 1/1601
See application file for complete search history.

(56) References Cited

U.S. PATENT DOCUMENTS

| | | | |
|---|---|---|---|
| 5,625,531 A | 4/1997 | Padilla et al. | |
| 5,646,819 A * | 7/1997 | Hill, III | ............. A47B 21/0314 312/223.2 |
| 5,867,364 A | 2/1999 | Roberson | |

(Continued)

FOREIGN PATENT DOCUMENTS

| | | |
|---|---|---|
| DE | 8709217 U1 | 9/1987 |
| DE | 4316858 A1 | 11/1993 |

(Continued)

*Primary Examiner* — Matthew W Ing
(74) *Attorney, Agent, or Firm* — Leydig, Voit & Mayer, Ltd.

(57) ABSTRACT

A housing for switchgear includes: first and second parallel side walls connected by a frame, a top wall, and/or a bottom wall; a door extending between the first and second side walls and arranged hingedly on the first side wall, a door hinge axis of the door being parallel to the side walls; and an instrument panel including a front face and third and fourth parallel side walls extending perpendicular from the front face. The door has an opening through which the third and fourth side walls of the instrument panel extend. The instrument panel is hingedly arranged on the door. An instrument panel hinge axis of the instrument panel is parallel to the door hinge axis. The instrument panel hinge axis is positioned adjacent to the second side wall.

12 Claims, 3 Drawing Sheets

(56) References Cited

U.S. PATENT DOCUMENTS

| | | | | |
|---|---|---|---|---|
| 6,359,270 | B1* | 3/2002 | Bridson | G06Q 10/107 219/679 |
| 7,869,201 | B2* | 1/2011 | McCoy | F16M 11/08 248/917 |
| 8,875,538 | B2* | 11/2014 | Lee | F25D 23/02 62/389 |
| 2001/0025497 | A1* | 10/2001 | Roh | F25D 23/00 62/125 |
| 2006/0125360 | A1* | 6/2006 | Kim | F16M 11/08 312/405.1 |
| 2007/0058092 | A1* | 3/2007 | Ryu | F16M 11/08 348/836 |
| 2007/0295020 | A1* | 12/2007 | Lee | F16M 11/08 62/259.2 |
| 2008/0123284 | A1* | 5/2008 | Jaramillo | G06F 1/1601 361/679.1 |

FOREIGN PATENT DOCUMENTS

| | | |
|---|---|---|
| DE | 202014102987 U1 | 10/2015 |
| EP | 1956692 A1 | 8/2008 |
| EP | 2053713 A1 | 4/2009 |
| WO | WO 2013127798 A2 | 9/2013 |

\* cited by examiner

HOUSING

CROSS-REFERENCE TO PRIOR APPLICATION

Priority is claimed to Indian Patent Application No. 201711022836, filed on Jun. 29, 2017, and British Patent Application No. GB 1715143.2, filed on Sep. 20, 2017, the entire disclosures of which are hereby incorporated by reference herein.

FIELD

The invention relates to housing for example for switchgear.

BACKGROUND

DE 202014102987 discloses a housing with a hinged door to which a module is arranged. This publication shows that the length of the module is of influence on the rotation of the door and width of the housing. Especially at the position of the door lock, the module has a recess to allow the door with module to be opened.

So, when a module is arranged to a hinged door of a housing, the length of the module should be taken into account when designing the width of the housing. When the housing is too small, the rotation of the door with the module extending on the back of the door will be blocked by one of the walls of the housing.

WO 2013127798 discloses a housing with a hinged door. The housing houses a module, which protrudes with a substantial length through an opening in the door. To allow the door to open, the frame of the opening in the door widens, when the door lock is unlocked, such that door can rotate around the extending part of the module.

However, with this embodiment, the module remains in the housing when the door is opened. This is not always desired.

Furthermore, it is desired to reduce the width of the housing, such that the space requirements for switchgear housing is reduced and on the other hand it is desired to arrange larger modules to the hinged doors of the housing.

SUMMARY

In an embodiment, the present invention provides a housing comprising: first and second parallel side walls connected by a frame, a top wall, and/or a bottom wall; a door extending between the first and second side walls and arranged hingedly on the first side wall, a door hinge axis of the door being parallel to the side walls; and an instrument panel comprising a front face and third and fourth parallel side walls extending perpendicular from the front face, wherein the door has an opening through which the third and fourth side walls of the instrument panel extend, wherein the instrument panel is hingedly arranged on the door, wherein an instrument panel hinge axis of the instrument panel is parallel to the door hinge axis, and wherein the instrument panel hinge axis is positioned adjacent to the second side wall.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
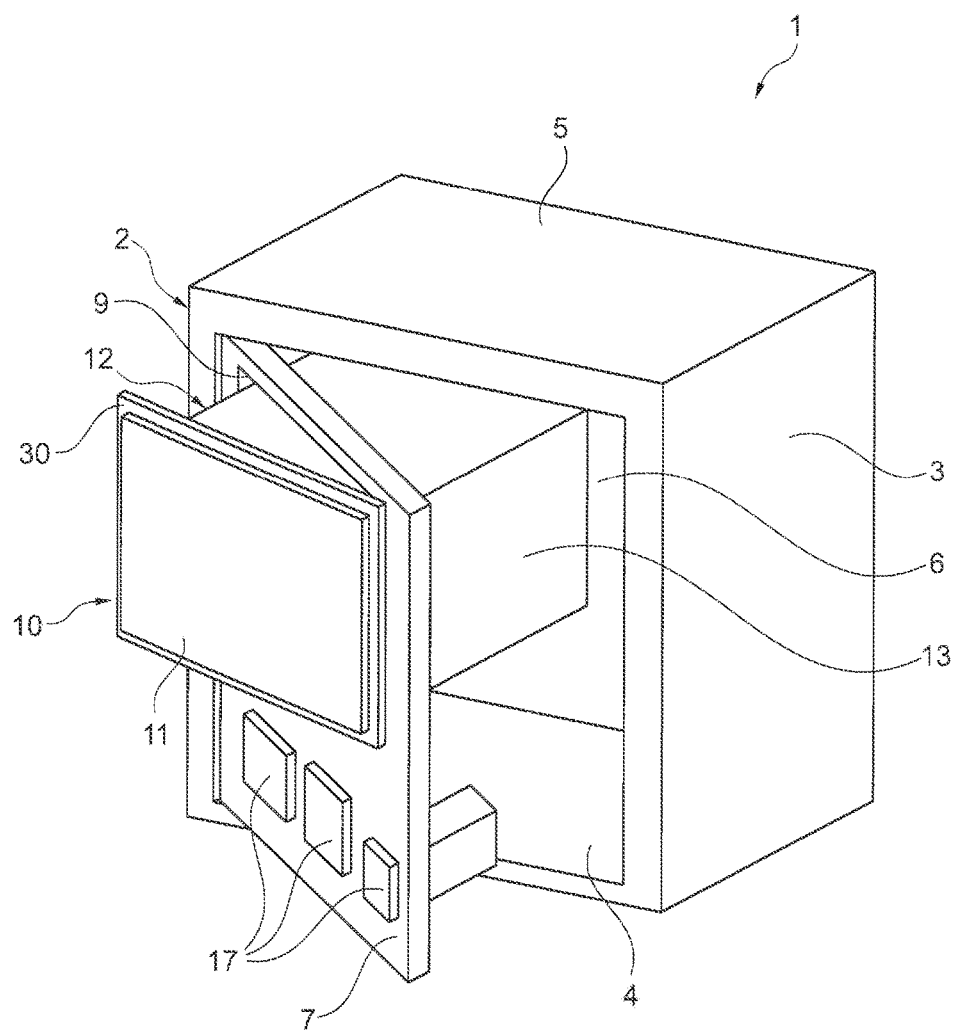
FIG. 1 shows a perspective view of an embodiment of a housing according to the invention.

In an embodiment, the present invention provides a housing comprising:
first and second parallel side walls connected by a frame, top wall and/or bottom wall;
a door extending between the first and second side walls and arranged hingedly to the first side wall, wherein the door hinge axis is parallel to the side walls;
an instrument panel comprising a front face and third and fourth parallel side walls extending perpendicular from the front face;
wherein the door has an opening through which the third and fourth side walls of the instrument panel extend; and
wherein the instrument panel is hingedly arranged to the door, wherein the instrument panel hinge axis is parallel to the door hinge axis and wherein the instrument panel hinge axis is positioned adjacent to the second side wall.

With the housing according to the invention, the instrument panel is hinged in the door of the housing, which door on its own is also hinged to the housing. Because the door hinge axis and instrument panel hinge axis are arranged on opposite sides of the housing, i.e. the door hinge axis to the first side wall and the instrument panel hinge axis adjacent to the second side wall, the door can be opened even when the instrument panel has a substantial length.

With the opposite arrangement of door hinge axis and the instrument panel hinge axis, a Z-shaped hinge is provided for the instrument panel, allowing for the instrument panel to move first substantially parallel to the first and second walls out of the housing, before making a rotating movement with the door. As a result part of the length of the instrument panel is already moved out of the housing, before the rotation of the instrument panel starts and the remaining length swings toward the second side wall. This allows for the instrument panel to be longer than with housings according to the prior art or to reduce the width of the housing.

An additional advantage of the Z-shaped hinge, is that the instrument panel is moved somewhat towards the door hinge axis, before the rotation starts when opening the door. This also contributes to additional space for the instrument panel to rotate along with the door.

Although, the instrument panel hinge axis could be arranged between the third and fourth side walls, it is preferred when the instrument panel hinge axis is positioned between the second side wall and the instrument panel. This allows for a maximum movement of the instrument panel parallel to the first and second side walls before the rotation starts.

In a further embodiment of the housing according to the invention, the housing further comprises a top wall and a bottom wall parallel to the top wall and perpendicular to the first and second side walls. Preferably, also a back wall is provided, such that the walls of the housing fully enclose the parts inside the housing, such as switchgear.

In yet another preferred embodiment of the housing according to the invention the instrument panel further comprises a top wall and a bottom wall parallel to the top wall and perpendicular to the third and fourth side walls. Also preferred, the instrument panel also comprises a back wall, such that the instruments enclosed in the instrument panel are shielded even when the door with the instrument panel is fully opened.

In a preferred embodiment of the housing according to the invention, a latch is arranged in the door to lock the door to the second side wall, which latch furthermore blocks the instrument panel from rotation around the instrument panel hinge axis in the locked position of the latch.

By using a single latch, which both locks the door to the second side wall and blocks rotation of the instrument panel, a user friendly embodiment is provided. With this embodiment the user only needs to unlock a single latch to open the door and have the instrument panel to rotate in the door.

In a further preferred embodiment of the housing according to the invention a bracket is arranged to the instrument panel, which bracket comprises a slot, and wherein the latch comprises an elongate element rotatable around a center zone of the elongate element, wherein, in the locked position of the latch, a first end of the elongate element extends through the slot and wherein a second end of the elongate element engages on the second side wall.

By a single rotation of the elongate element of the latch around the center zone both the door is locked and the instrument panel rotation axis is blocked, thus providing a simple and effective embodiment.

In yet another embodiment of the housing according to the invention the circumferential edge of the front face of the instrument panel envelops in size the circumferential edge of the opening in the door, such that the front face covers the opening in the door.

In yet a further preferred embodiment of the housing according to the invention, in view of a direction parallel to the door hinge axis, the distance between the door hinge axis and the part of the instrument panel most remote from the door hinge is larger than the distance between the door hinge axis and the second side wall.

These and other features of the invention will be elucidated in conjunction with the accompanying drawings.

FIG. 1 shows a perspective view of an embodiment of a housing 1 according to the invention. This housing has a first side wall 2, a second side wall 3, a top wall 5, a bottom wall 4 and a back wall 6. A door 7 is hingedly arranged to the first side wall 2 via a door hinge axis 8 (see FIG. 2)

The door 7 has an opening 9 in which an instrument panel 10 is positioned via a frame 30. The instrument panel 10 has a front face 11 arranged on the outside of the housing 1 with a third side wall 12 and a fourth side wall 13 extending from the front face 11 through the opening 9 into the housing 1. The instrument panel 10 has furthermore a bottom wall, a top wall 14 and a back wall 15.

The instrument panel 10 is hingedly arranged via the frame 30 along a instrument panel hinge axis 16 to the door 7. This instrument panel hinge axis 16 is positioned between the second side wall 3 and the instrument panel 10. The frame 30 allows for easy removal of the instrument panel 10. The frame 30 allows also for a stopper to be arranged, which limits the rotation of the instrument panel 10 relative to the door.

Further instruments 17 are fixedly arranged in the door 7.

Figure 2A:
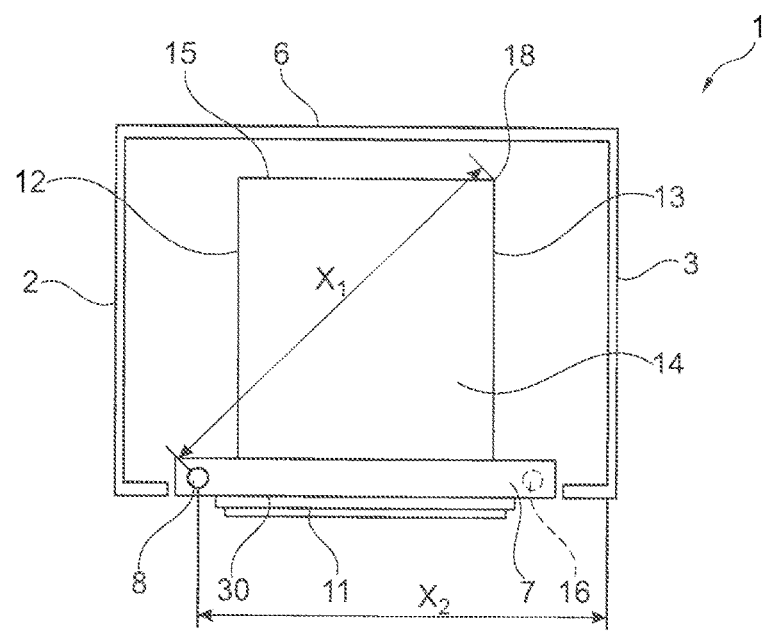
FIGS. 2A-2C show a top cross-sectional view of the embodiment of FIG. 1 in three different positions.

Shown in FIG. 2A is the housing 1 with the door 7 in closed position. The front face 11 of the instrument panel 10 is positioned flat against the door 7.

If the door 7 with the instrument panel 10 would be rotated only along the door hinge axis 8, then the part 18, which is the most remote from the door hinge axis 8 would get into contact with the second side wall 3. This is because the distance $x_1$ between the door hinge axis 8 and the remote part 18 is larger than the distance $x_2$ between the door hinge axis 8 and the second side wall 3.

Figure 2B:
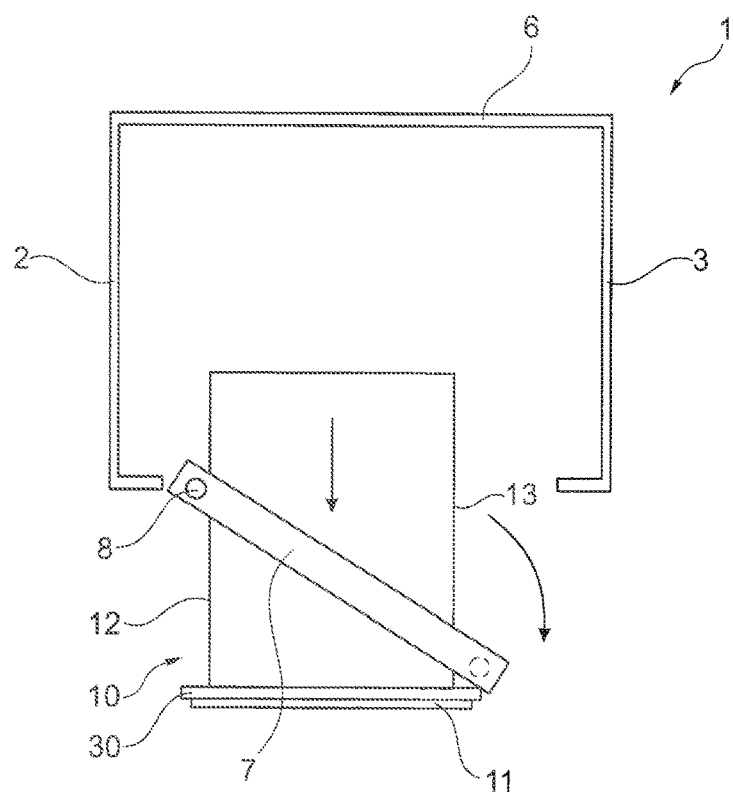

FIG. 2B shows the housing 1 with the door 7 unlocked and rotated along the door hinge axis 8. The instrument panel 10 has made a counter rotation around the instrument panel hinge axis 16 relative to the door 7, such that the instrument panel 10 is translated parallel to the first and second side walls 2, 3 and partially out of the housing 1.

Figure 2C:
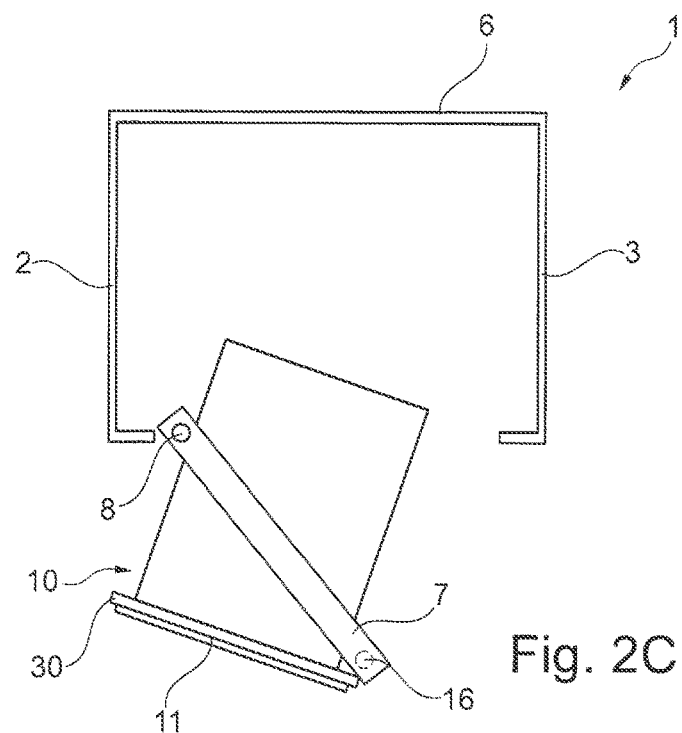

In this position the instrument panel 10 can be further rotated with the door 7 around the door hinge axis 8, as illustrated in FIG. 2C, such that the door 7 can be fully opened with the instrument panel 10 despite the length of the instrument panel 10 and the limited width between the first and second side walls 2, 3.

Figure 3:
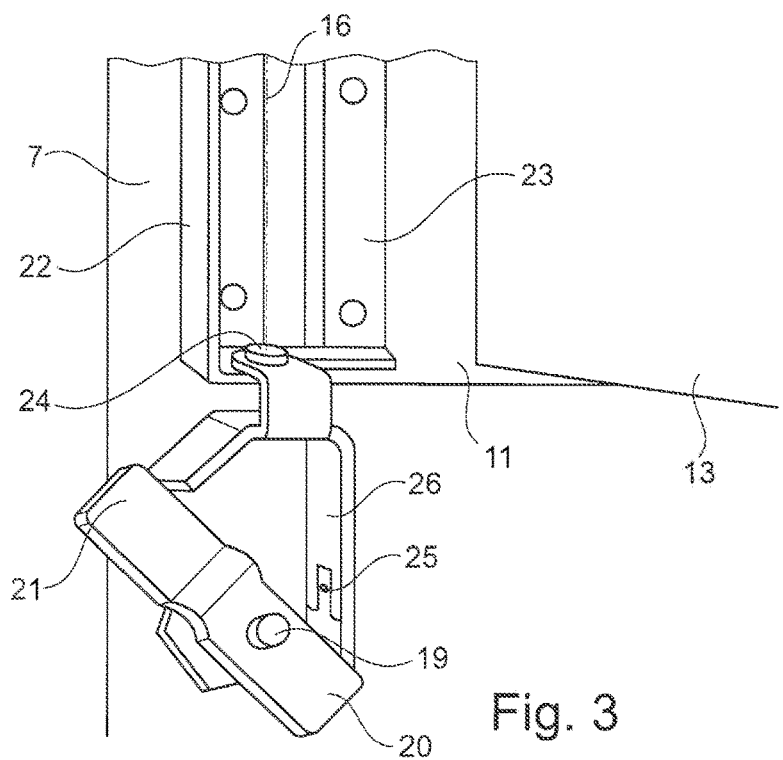
FIG. 3 shows a perspective view of the door lock of the embodiment of FIG. 1.

FIG. 3 shows a perspective view of the back side of the door 7. The door has a latch axle 19 on which a elongate element with a first end 20 and a second end 21. This elongate element 20, 21 is shown in unlocked position and can be rotated to a horizontal lock position.

A mounting bracket 22 is arranged on the back side of the door 7 and cooperates with a bracket 23, which is mounted to the front face 11 of the instrument panel 10, to provide a hinge point 24 on the instrument panel hinge axis 16.

The bracket 23 has a slot 25 arranged in an extension 26 of the bracket 23. The first end 20 of the elongate element 20, 21 will engage in the slot 25 to provide a blocking of the rotation around the instrument panel hinge axis 16, when the elongate element 20, 21 is in the horizontal lock position.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A housing comprising:
   first and second parallel side walls connected by a frame, a top wall, and a bottom wall;

a door extending between the first and second side walls and arranged hingedly on the first side wall, a door hinge axis of the door being parallel to the side walls; and an instrument panel comprising a front face and third and fourth parallel side walls extending perpendicular from the front face, wherein the door has an opening through which the third and fourth side walls of the instrument panel extend, wherein the instrument panel is hingedly arranged on the door, wherein an instrument panel hinge axis of the instrument panel is parallel to the door hinge axis, and wherein the instrument panel hinge axis is positioned on a side of the door closest to the second side wall and the door hinge axis is positioned on a side of the door closest to the first side wall such that the instrument panel hinge axis and the door hinge axis are arranged on opposite sides of the housing when the door is in the closed position.

2. The housing according to claim 1, wherein the instrument panel hinge axis is positioned between the second side wall and the instrument panel.

3. The housing according to claim 1, further comprising a top wall and a bottom wall parallel to the top wall and perpendicular to the first and second side walls.

4. The housing according to claim 1, wherein the instrument panel further comprises an instrument panel top wall and an instrument panel bottom wall parallel to the top wall of the housing and perpendicular to the third and fourth side walls of the instrument panel.

5. The housing according to claim 1, further comprising a latch arranged in the door and configured to lock the door to the second side wall and to block the instrument panel from rotation around the instrument panel hinge axis in a locked position of the latch.

6. The housing according to claim 5, further comprising a bracket arranged on the instrument panel, the bracket comprising a slot,
　　wherein the latch comprises an elongate element rotatable around a center zone of the elongate element,
　　wherein, in the locked position of the latch, a first end of the elongate element extends through the slot, and
　　wherein a second end of the elongate element engages on the second side wall.

7. The housing according to claim 1, wherein a circumferential edge of the front face of the instrument panel envelops in size a circumferential edge of the opening in the door, such that the front face covers the opening in the door.

8. The housing according to claim 1, wherein, in a direction parallel to the door hinge axis, a distance between the door hinge axis and a part of the instrument panel most remote from the door hinge is larger than a distance between the door hinge axis and the second side wall.

9. The housing according to claim 1, wherein the housing is a housing for switchgear.

10. A housing comprising:
first and second parallel side walls connected by a frame, a top wall, and a bottom wall;

a door extending between the first and second side walls and arranged hingedly on the first side wall, a door hinge axis of the door being parallel to the side walls; and an instrument panel comprising a front face and third and fourth parallel side walls extending perpendicular from the front face, wherein the door has an opening through which the third and fourth side walls of the instrument panel extend, wherein the instrument panel is hingedly arranged on the door, wherein an instrument panel hinge axis of the instrument panel is parallel to the door hinge axis, and wherein the instrument panel hinge axis is positioned adjacent to the second side wall, the housing further comprising a latch arranged in the door and configured to lock the door to the second side wall and to block the instrument panel from rotation around the instrument panel hinge axis in a locked position of the latch.

11. The housing according to claim 10, further comprising a bracket arranged on the instrument panel, the bracket comprising a slot,
　　wherein the latch comprises an elongate element rotatable around a center zone of the elongate element,
　　wherein, in the locked position of the latch, a first end of the elongate element extends through the slot, and
　　wherein a second end of the elongate element engages on the second side wall.

12. A housing comprising:
first and second parallel side walls connected by a frame, a top wall, and a bottom wall;

a door extending between the first and second side walls and arranged hingedly on the first side wall, a door hinge axis of the door being parallel to the side walls; and an instrument panel comprising a front face and third and fourth parallel side walls extending perpendicular from the front face, wherein the door has an opening through which the third and fourth side walls of the instrument panel extend, wherein the instrument panel is hingedly arranged on the door, wherein an instrument panel hinge axis of the instrument panel is parallel to the door hinge axis, wherein the instrument panel hinge axis is positioned adjacent to the second side wall, and wherein, in a direction parallel to the door hinge axis, a distance between the door hinge axis and a part of the instrument panel most remote from the door hinge is larger than a distance between the door hinge axis and the second side wall.

* * * * *